United States Patent
Biran et al.

(10) Patent No.: US 8,789,043 B2
(45) Date of Patent: *Jul. 22, 2014

(54) OPTIMIZED PLACEMENT PLANNING FOR VIRTUAL MACHINES IN A NETWORK BY BREAKING RELOCATION GRAPH INTO ONE OR MORE CORES TO APPLY DIFFERENT SOLUTIONS

(75) Inventors: Ofer Biran, Haifa (IL); Ari Freund, Haifa (IL); Erez Hadad, Nahariya (IL); Evgeny Hazanovich, Haifa (IL); Yosef Moatti, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 720 days.

This patent is subject to a terminal disclaimer.

(21) Appl. No.: 12/912,805

(22) Filed: Oct. 27, 2010

(65) Prior Publication Data
US 2012/0042311 A1 Feb. 16, 2012

Related U.S. Application Data

(63) Continuation of application No. 12/409,548, filed on Mar. 24, 2009, now Pat. No. 7,904,540.

(51) Int. Cl.
*G06F 9/455* (2006.01)
*G06F 9/46* (2006.01)

(52) U.S. Cl.
USPC .............................................. 718/1; 718/104

(58) Field of Classification Search
CPC ... G06F 9/45558; G06F 9/45533; G06F 9/5077
USPC ....................................................... 718/1, 104
See application file for complete search history.

(56) References Cited

U.S. PATENT DOCUMENTS

2008/0295096 A1* 11/2008 Beaty et al. .................... 718/1

OTHER PUBLICATIONS

Kornhaser et al., "Coordinating Pebble Motion on Graphs, the Diameter of Permutation Groups, and Applications", IEEE, 1984, pp. 241-250.*

* cited by examiner

*Primary Examiner* — Abdullah Al Kawsar
*Assistant Examiner* — Brian Chew

(57) ABSTRACT

Methods and systems for generating a placement plan for one or more virtual machines (VMs) in a computing environment are provided. The method comprises providing, to a computing system, input parameters comprising a current placement for the one or more VMs on one or more hosts in a computing network; a target placement that assigns at least one of the one or more VMs to at least another host in said one or more hosts; and a set of constraints with which both the current placement and the target placement comply.

16 Claims, 21 Drawing Sheets

OPTIMIZED PLACEMENT PLANNING FOR VIRTUAL MACHINES IN A NETWORK BY BREAKING RELOCATION GRAPH INTO ONE OR MORE CORES TO APPLY DIFFERENT SOLUTIONS

CROSS-REFERENCE TO RELATED APPLICATIONS

The present application is a continuation-in-part of and claims priority to application Ser. No. 12/409,548, filed on Mar. 24, 2009, the content of which is hereby incorporated by reference herein, pursuant to 35 USC 120.

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to virtual machines (VMs) and, more particularly, to managing placement and availability of VMs in a network environment.

BACKGROUND

VMs may be deployed on one or more hosts in a network environment to emulate the functionality of a hardware base machine. Typically, host software running on a software or hardware platform (e.g., a host machine) may be used to implement a VM. A host software generally referred to as a hypervisor or a VM monitor provides a platform-independent execution environment for one or more VMs.

A so called cloud network computing environment may be implemented based on a model of service delivery for enabling convenient, on-demand network access to a shared pool of configurable computing resources (e.g. networks, network bandwidth, servers, processing, memory, storage, applications, VMs, and services). The resources are generally provisioned and released by way of a resource manager that services periodical or requested updates for placement of VMs on one or more hosts in the cloud network environment.

In certain circumstances, a host software detects an imminent power failure, hardware failure, or other condition that may cause a host machine to become non-operational. In that case, the VMs on the failed host machine may need to be restarted, migrated or evacuated to another host machine. Placement changes for VMs may be also attributed to deploying new VMs, removing existing ones, or optimizing the placement to meet certain goals.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Computer implemented methods and systems for generating a placement plan for one or more virtual machines (VMs) in a computing environment are provided, in accordance with one or more embodiments. The method comprises providing, to a computing system, input parameters comprising a current placement for the one or more VMs on one or more hosts in a computing network; a target placement that assigns at least one of the one or more VMs to at least another host in said one or more hosts; and a set of constraints with which both the current placement and the target placement comply.

The method may further comprise computing a placement plan by ordering placement changes derived from one or more differences between the target placement and the current placement to determine a placement sequence that results in accomplishing the target placement, wherein the set of constraints is satisfied in intermediary placement states observed in the placement sequence, avoiding any relocation cycle. The computation of the placement plan, in one implementation, comprises computing a relocation graph that reflects the placement changes for VM deployments, relocations or removals that are to be performed to implement the placement plan.

In one embodiment, each node in the graph represents a host, and each edge in the graph pointing from a first host to a second host represents a planned VM relocation from the first host to the second host. The method may further comprise breaking the relocation graph into one or more cores, using the input parameters to the computing system, wherein each core comprises a smaller relocation graph; for each core, determining if the core is a simple core; in response to determining that a core is a simple core, applying a first solution to the relocation graph to determine a relocation plan or a placement scheme for the VMs in that core.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In one embodiment, a method that enables automated virtual machine placement planning (VMPP) is provided. VMPP involves computation of a plan for changing the placement of VMs onto one or more host machines. Placement of a VM refers to the VM being placed at a host and being assigned portions of the hosts' resource. The placement may need to meet a set of restrictions or policies. A resource manager (not shown) may manage placement and availability of the VMs. In one embodiment, the resource manager may utilize a placement engine to compute an initial placement of the VMs on the hosts according to a set of placement constraints defined for the VMs.

Figure 1A:
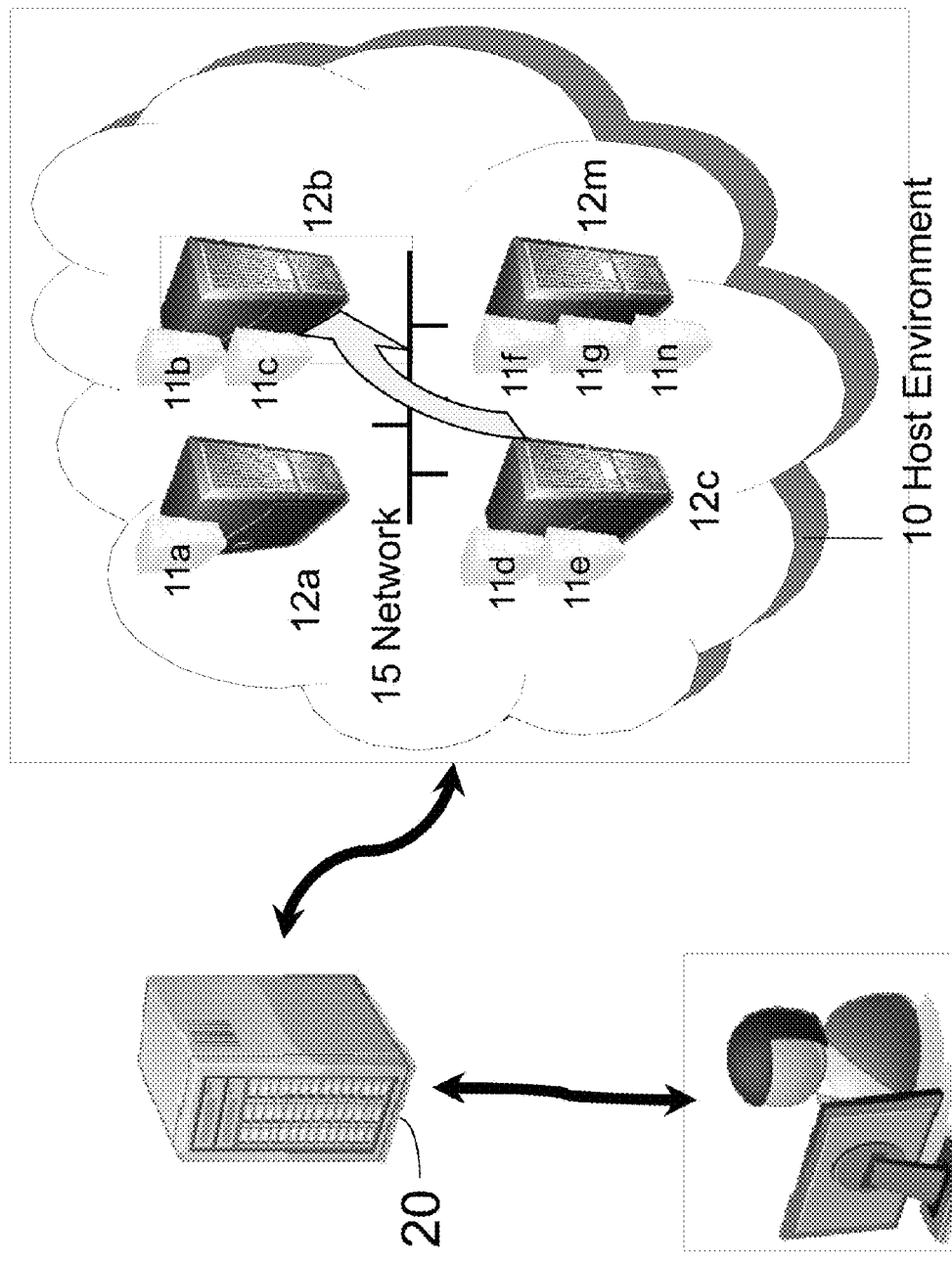
FIGS. 1A, 1B, 1C illustrate exemplary network and operating environments in which one or more VMs may be deployed, in accordance with one or more embodiments.

FIG. 1A depicts a diagram illustrating a computing environment 10 according to one or more embodiments. An example VM hosting environment 10 (e.g., a data center or "cloud") is illustrated that comprises host machines (HMs) (e.g., servers or like physical machine computing devices) connected via a network 15 and a management server 20 in which the current invention is employed. As shown, physical servers 12a to 12m, are adapted to dynamically provide one or more VMs (VM1 through VMn denoted as 11a through 11n, respectively) using available virtualization technology, e.g., available from VMware or XenSource.

As illustrated in FIG. 1A, multiple VMs may be placed into a single host machine and share its resources of CPU, memory etc, thereby increasing the utilization of an organization's data center. Managing the placement of many VMs onto many host machines may require optimization and proper forecasting. In one embodiment, this task is delegated to an automated management server that monitors the infrastructure and automatically manipulates the placement as needed by moving VMs between hosts (over the connecting network 15), suspending/resuming VMs, etc.

In one embodiment, the infrastructure may be regarded as a single resource-rich entity into which VMs may be deployed and removed with ease. The management server itself may be running in a VM hosted on one of the HMs, or outside the HM. The server may be connected to a client console 40 providing a display as shown in FIG. 1A, or to a global management system that manages larger-scale infrastructure.

Figure 1B:
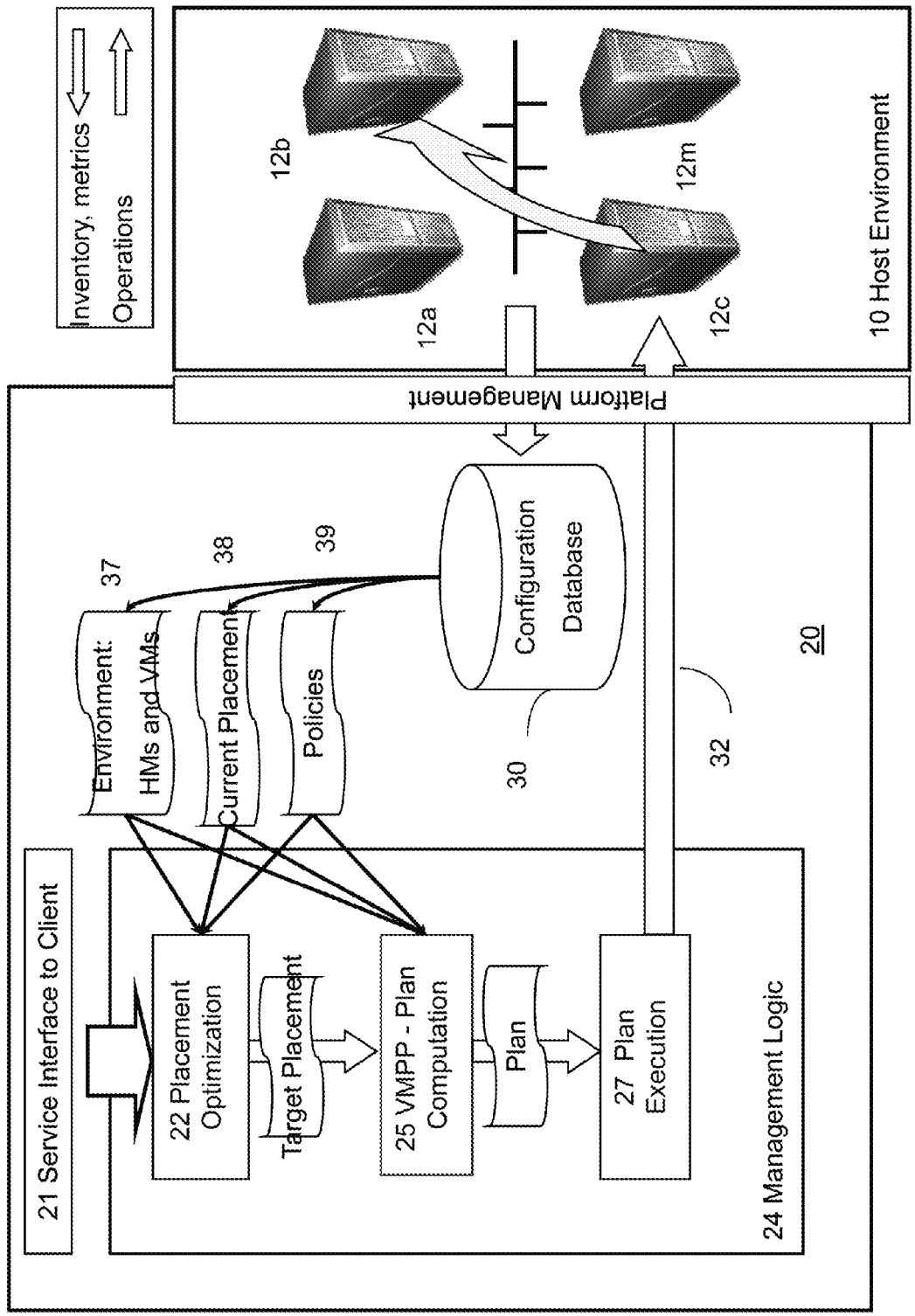

Referring to FIG. 1B, a management server 20 of FIG. 1A is illustrated in more detail, in accordance with one exemplary embodiment. The management functions 24 implemented in the management server 20 in such embodiment may include (1) determining a new, or target placement of VMs based on the environment, current placement and the policies from a database, e.g., a configuration database 30 holding the environment information (inventory of HMs and VMs) 37, their current placements 38, policies to be enforced 39 and metrics received as messages 34 from the HM server devices 12a-12m; (2) computing a plan to achieve the target placement from the current placement; and (3) executing the plan to actually achieve the target placement.

A first function executed by logic implemented in management server 20 is represented as the Placement Optimizer 22, which implements optimization and constraint satisfaction (CSP) problems. A second function executed by logic implemented in management server 20 is represented as the VMPP computation 25. Based on the environment, current placement, policies and target placement (which was computed by the optimizer), management server 20 computes a plan to change the current placement into the target placement using actionable steps.

A third function executed by logic implemented in management server 20 is represented as Plan Execution logic 27 that generates the messages 32 to carry out the computed VMPP operations 32 and, interfaces with the network 15 and each of the server devices 12a-12m that include the hypervisor component in virtualization products such as Xen or VMware to carry out the plan operations via a suitable platform management interface 40.

Figure 1C:
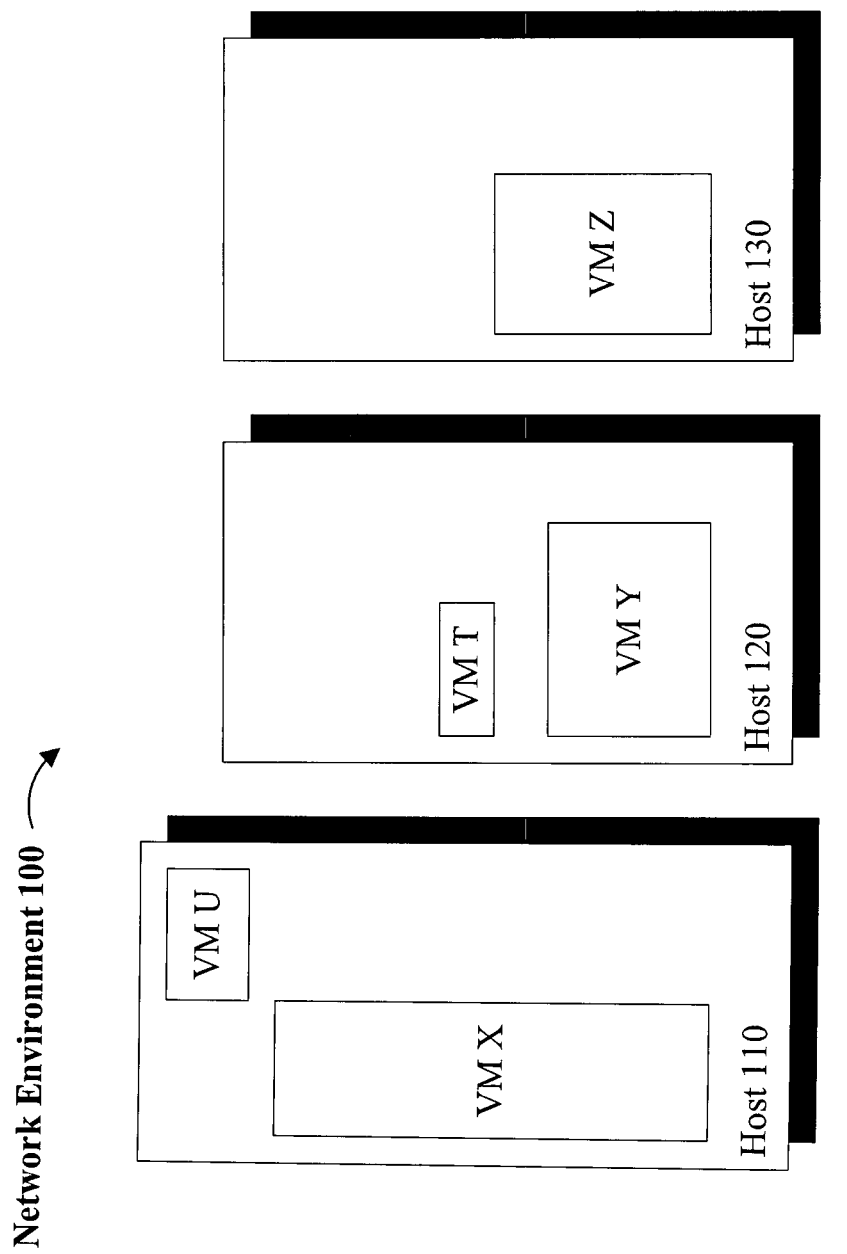

Referring to FIG. 1C, in accordance with one or more embodiments, exemplary network environment 100 comprises one or more hosts (e.g., hosts 110, 120, 130) and one or more VMs (e.g., VMs X, Y, Z, T, U). The placement engine may be configured as a constraint satisfaction problem (CSP) solver that utilizes first-order logic (i.e., computations) to compute a placement of a set of VMs on a set of hosts according to a set of placement constraints. The placement constraints may comprise one or more anti-collocation constraints, anti-location constraints, resource constraints, or other constraints relevant to placement of the VMs on the hosts.

An anti-collocation constraint may prohibit a VM from being placed on the same host as another VM (i.e., avoid a first and second VM from being collocated on the same host). An anti-location constraint may prohibit a VM from being placed on a certain host. A resource constraint may indicate that a certain level of a particular resource is to be allocated to a VM. Please note that in the following the terms migration and evacuation with respect to a VM may be used synonymously to mean that a VM executing on a first host is moved to a second host and has terminated execution on the first host.

In one embodiment, the resource manager may also ensure that the VMs continue to execute (i.e., are available) despite failure of one or more hosts. That is, the VMs may be protected against at least a certain number of host failures according to one or more factors (e.g., availability constraints, hereafter also sometimes referred to as resiliency level). An availability constraint may indicate the maximum number of host failures against which a VM is protected. For example, an availability constraint may indicate that a VM is N-resilient (e.g., is associated with an N resiliency level), where N indicates the number of available host to the VM for migration.

An illustrative and non-limiting example for applying the VMPP methodology is now described in consideration of the following scenario: A VM v1 is to be placed at host h5 where v8, v9 and v10 are currently placed (and whose eventual placement is elsewhere). Additionally, host h5 cannot accommodate v1 in addition to the already placed VMs at host h5. For example, v1 requires 5 resource units, h5 provides 8 resource units, and v8, v9 and v10 require 3, 4 and 1 resource units respectively. Thus v1 depends on particular subsets of {v8, v9, v10} to move away and free the resources.

In the above example, v1 depends on either {v8, v9} or {v9, v10} to move. In this case the dependencies between the VMs are formed as a result of the resource capacity constraints of the containing host. Consequently, moving VMs into and out of the host needs to be done in such an order that would guarantee that the host capacity does not become overloaded. In the above example, a valid plan would first move VMs {v8, v9} or {v9, v10} out of host h5 before moving v1 into h5.

In one implementation, a planning component may be constructed that allows the detection placement changes and the ordering dependencies to generate a valid plan that correctly orders the changes. In some embodiments, a host may be selected arbitrarily. Such host selection algorithms may result in migration cycles that may be broken using brute-force "abuse" techniques that temporarily suspend VMs or divert VMs from their designated target hosts. In the following methods and systems are provided that help reduce the need for abusing VMs by avoiding migration cycles where possible.

In one embodiment, a plan for achieving the target placement is implemented by starting at the current placement and gradually changing the current placement while processing the graph. In one embodiment however, the current placement of VMs on HMs is not changed (e.g., by actually relocating or placing VMs) when the plan is computed. A bipartite directed graph may be generated having, for example, two kinds of nodes: (1) nodes that represent the VMs and (2) nodes that represent the HMs, as illustrated in FIG. 2.

Each VM node may have one outgoing edge to a HM node and one incoming edge from a HM node. Each HM node may have zero or more outgoing edges to VM nodes and one or more incoming edges from VM nodes. Depending on implementation, not all VMs and HMs may participate in the graph. VMs whose placement doesn't change (current and target placement are the same) are filtered out. Similarly, HMs that have no pending VMs (i.e., participating VMs who need to be placed at them) are also filtered out.

Figure 2:
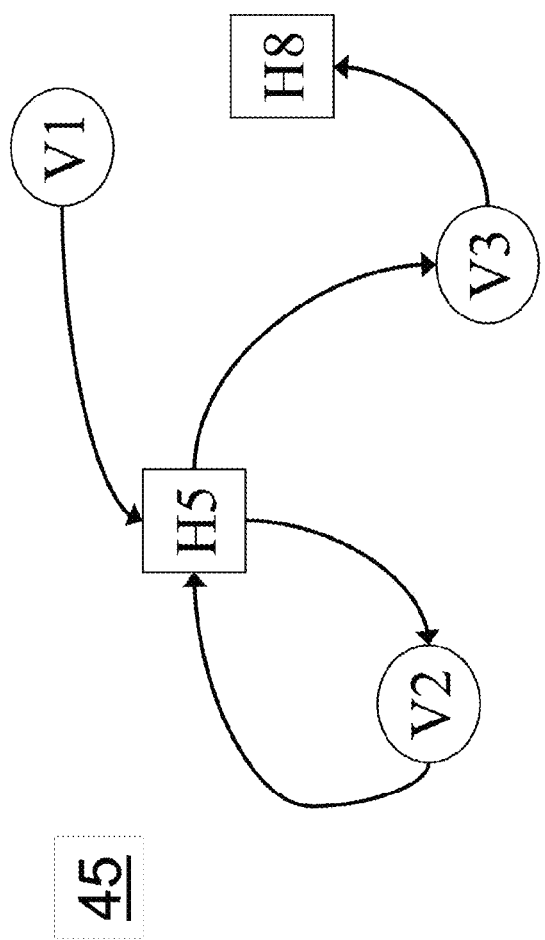
FIG. 2 illustrates a block diagram representing potential VM placements in a network, according to one embodiment.

FIG. 2 shows a simple example for a graph 45 that may be constructed by a preparation sequence according to one embodiment. There are three VMs whose placements change between the current and the target placement, and therefore will participate in the graph: V1, V2 and V3. Also, there are two HMs who participate in the graph because they are VMs that need to be placed on them: H5 and H8. V1 is currently un-placed and is to be placed at HM H5. V2 is currently placed at H5 but is to have its resource allocation adjusted. V3 is to move from its current HM H5 to HM H8.

Figure 3:
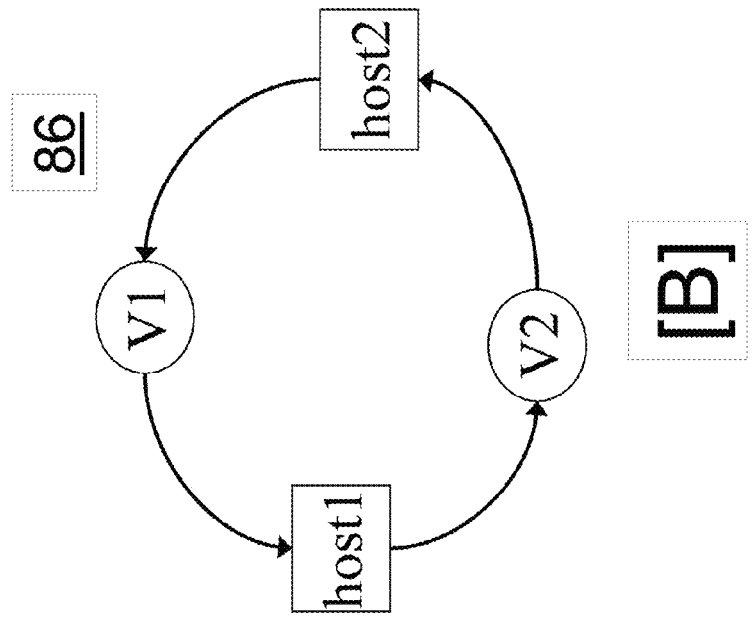
FIGS. 3A and 3B are exemplary migration cycles according to one or more embodiments.
Figure 3:
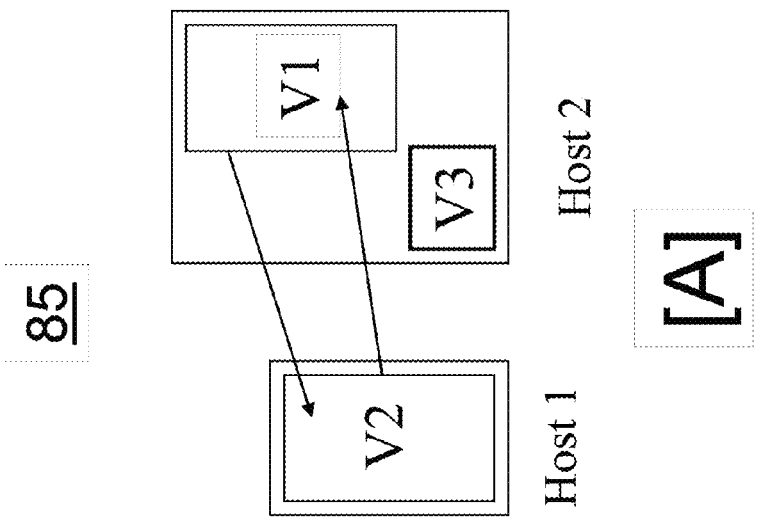

Referring to FIGS. 3A and 3B, exemplary migration cycles are illustrated according to one or more embodiments. FIG. 3A depicts an example flow description of a migration cycle 85 and FIG. 3B depicts an example graph 86 constructed according to the example migration cycle of FIG. 3A. In a migration cycle 85, multiple VMs prevent each other from reaching their target placement, so that all VMs become deadlocked—no ordering of placement instructions may put all the VMs of the cycle in their target placements without violating a policy or exceeding a host capacity, at least temporarily.

Generally, a migration cycle may be described as if all the deadlocked VMs may be ordered in such a way that each two consequent VMs in the order, as well as the first and the last VMs, share a common host, which is the target host of the former and the current host of the latter, and some policy or capacity constraint prevents the former from reaching its target placement before the latter—such is the cyclic nature of the problem. The example scenario 85 in FIG. 3A shows 2 hosts, host1 and host2. On host1 there is VM V2, and on host2 there are VMs V1 and V3. In the target placement (as shown by the black arrows in FIG. 9A) V2 needs to be relocated (migrated) to host2 and V1 needs to be relocated to host 1.

For illustrative purposes, the height and width of each box (VM/HM) in FIG. 3A describe its CPU and memory capacity/allocation, respectively. Thus, neither VM may be relocated first to its target host without overloading the host. As may be seen in FIG. 3B, the migration cycle also appears as a cycle in the graph 86 that is constructed by the preparation sequence, before the main algorithm 50 starts to run. If, for example, either of host1 or host2 had a large free resource reserve for CPU/memory, then the graph would have still shown a cycle, but no migration cycle would have actually occurred.

Figure 4A:
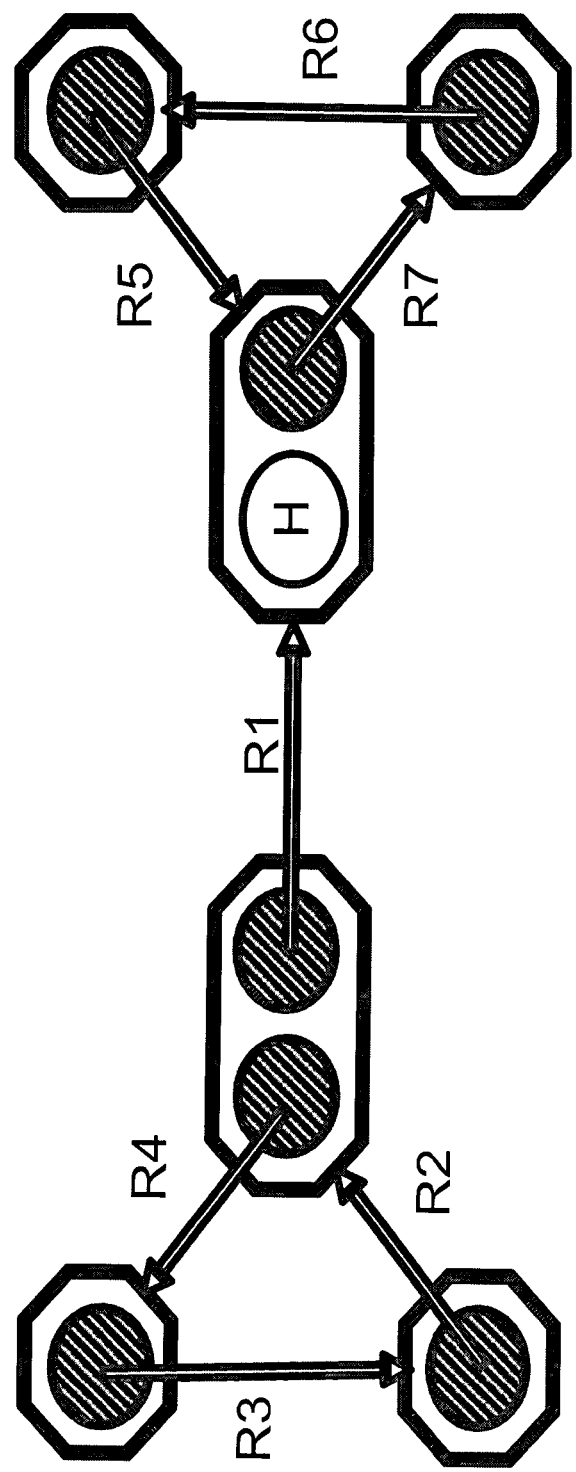
FIGS. 4A through 4I illustrate placement and migration of one or more VMs, in accordance with one or more embodiments.

Referring to FIG. 4A, in certain circumstances, a migration cycle or relocation cycle may result in VM placement changes deadlocking each other such that no further placement changes may be scheduled. In FIG. 4A, and other related figures, each octagonal shape represents a host machine, for example. The dark circles represents a VM, and an arrow represents a relocation. The arrow starts from the VM which should be relocated and points towards the host where it should be relocated according to a migration or relocation cycle determined by the above-noted techniques, for example.

The circle with letter "H" represents a vacant resource space in the designated host. For simplicity, we assume in this example that the VMs consume the same amount of resources and that vacant space is sufficient for accommodating a single VM. Also, it is assumed for brevity that there are no constraints other than resource constraints that affect the relocation in this specific example. Thus, as shown in FIG. 4A, two relocations are possible: R1 and R5. Without explicitly trying to avoid relocation cycles, a planner may choose to invoke R1 first, for example.

Figure 4B:
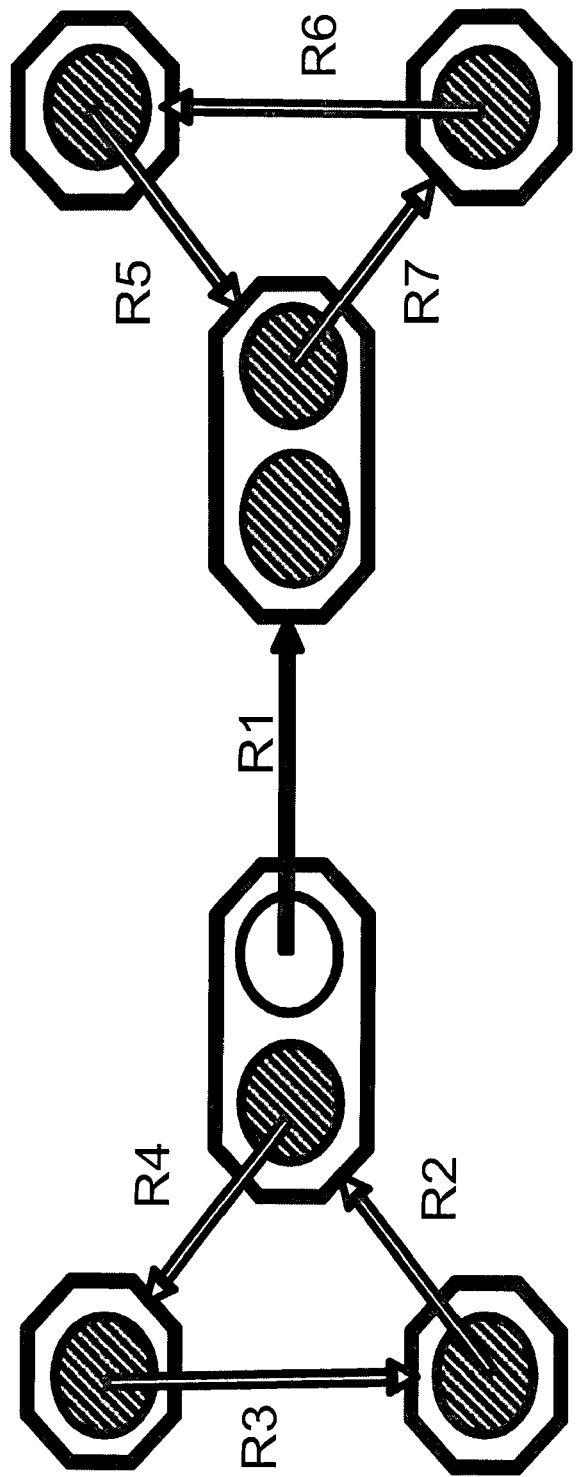
Figure 4C:
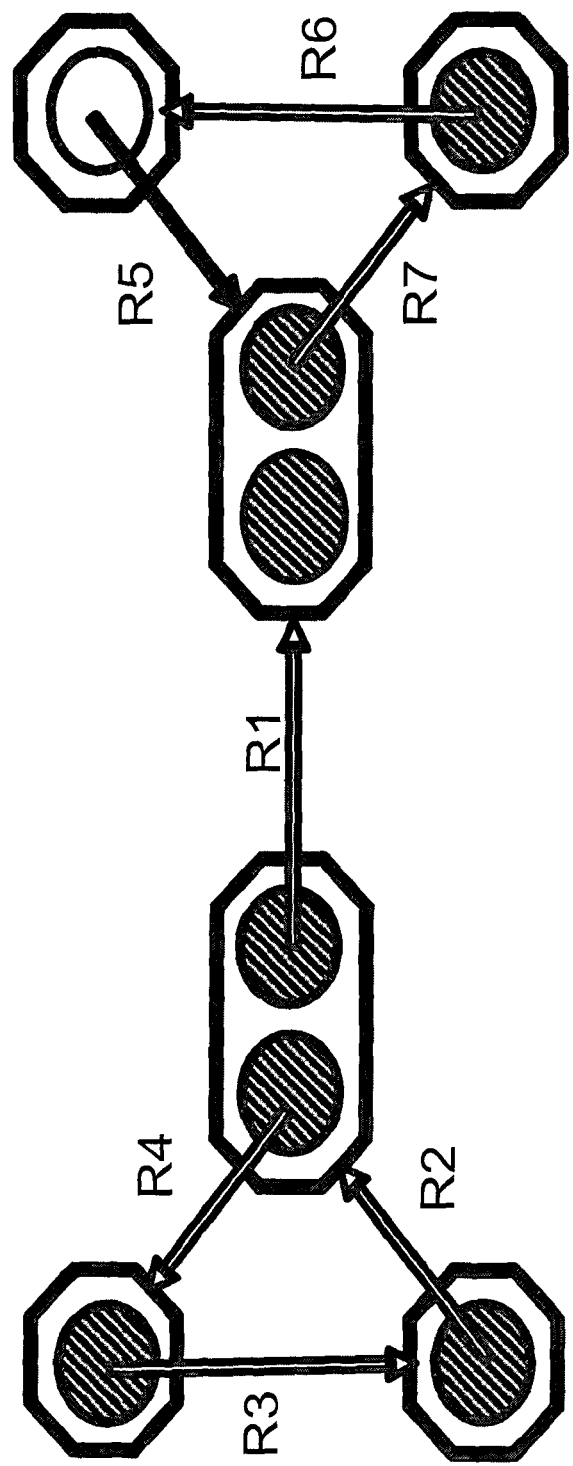
Figure 4D:
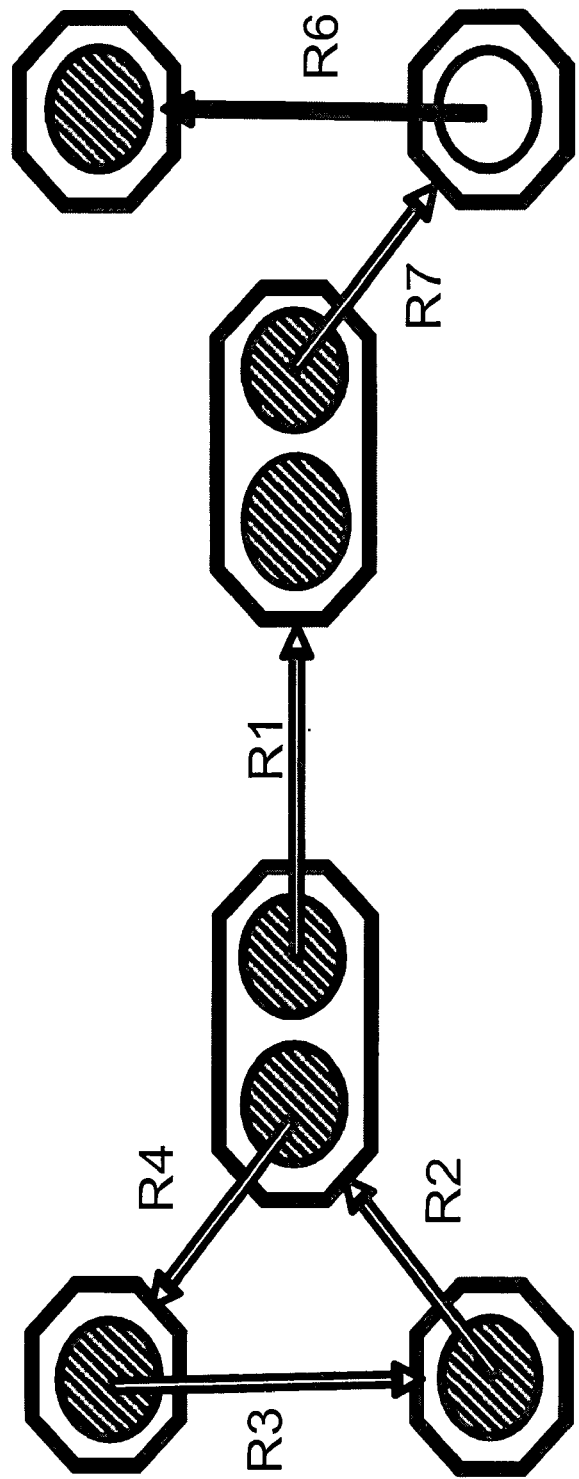
Figure 4E:
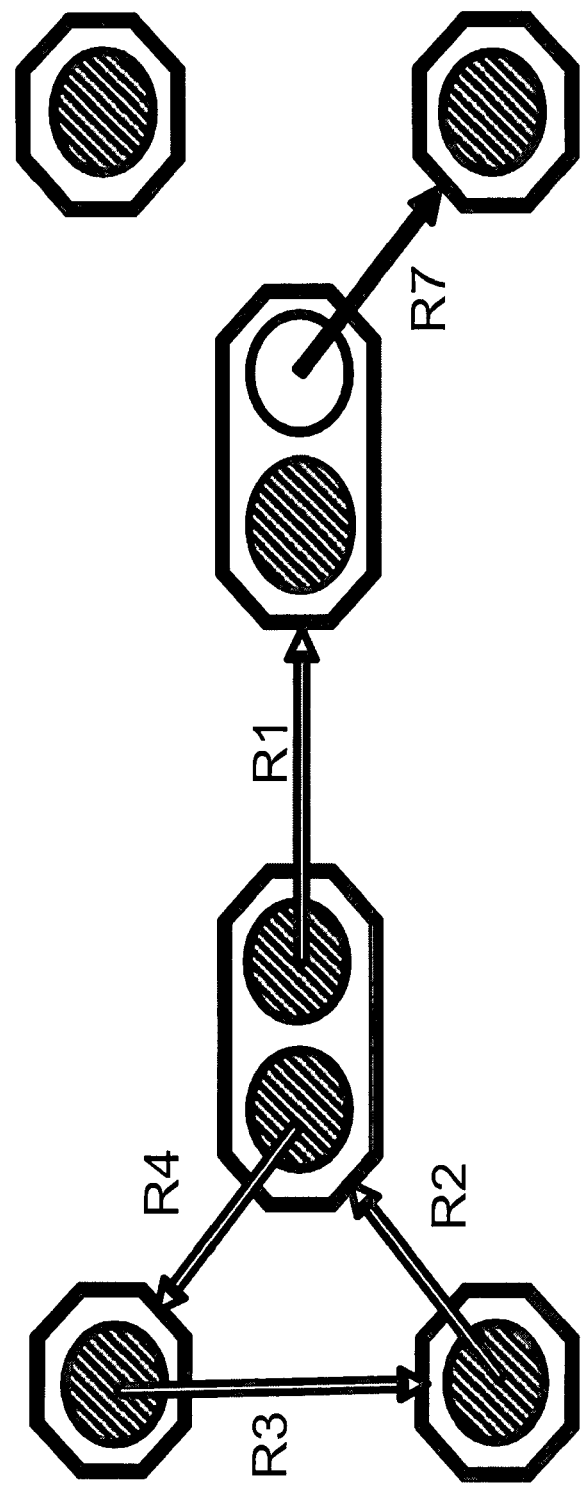
Figure 4F:
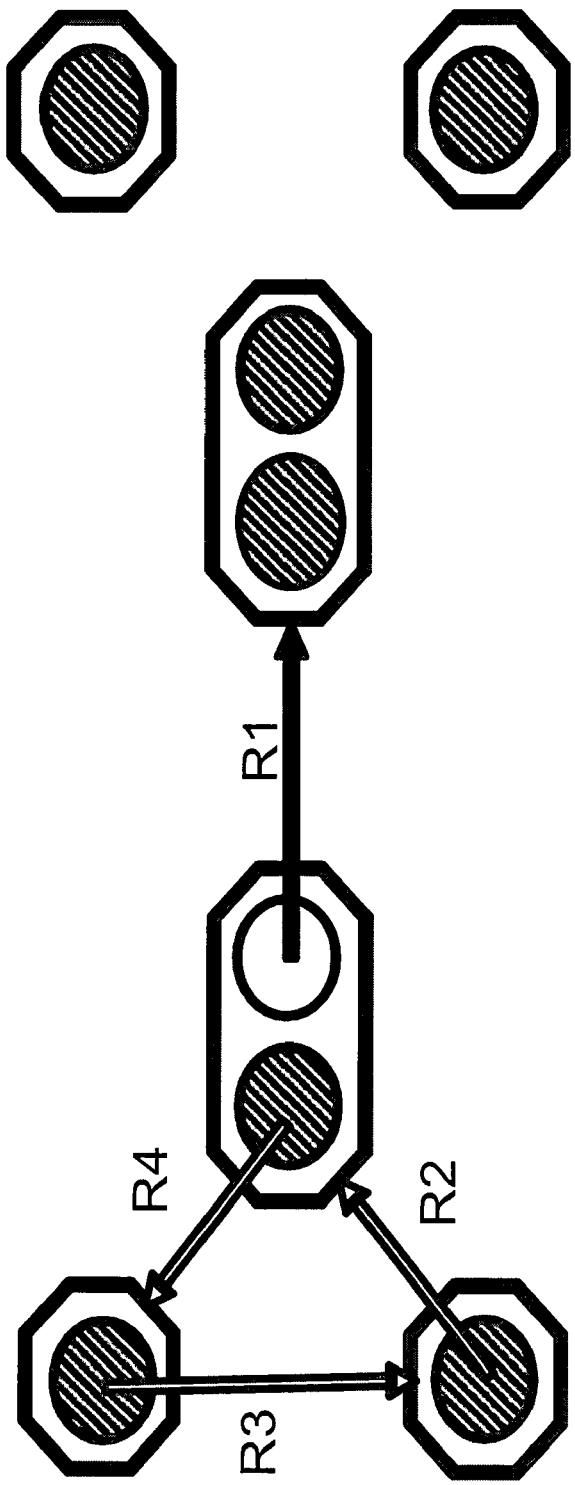
Figure 4G:
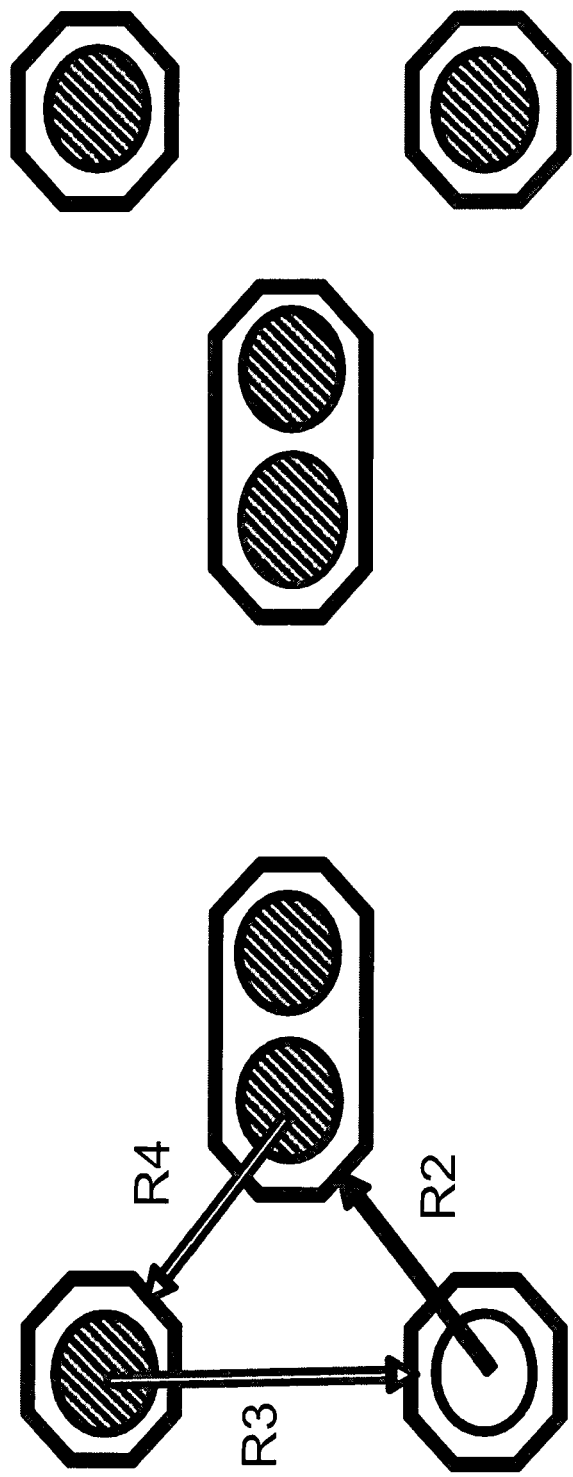
Figure 4H:
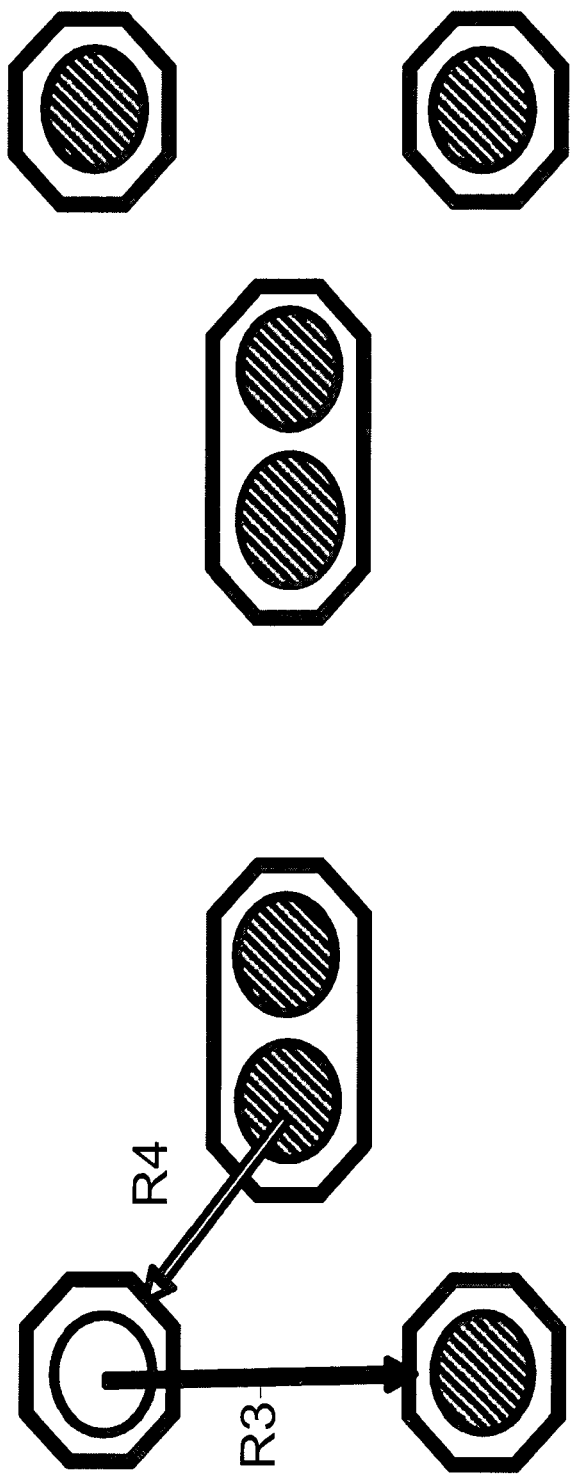
Figure 4I:
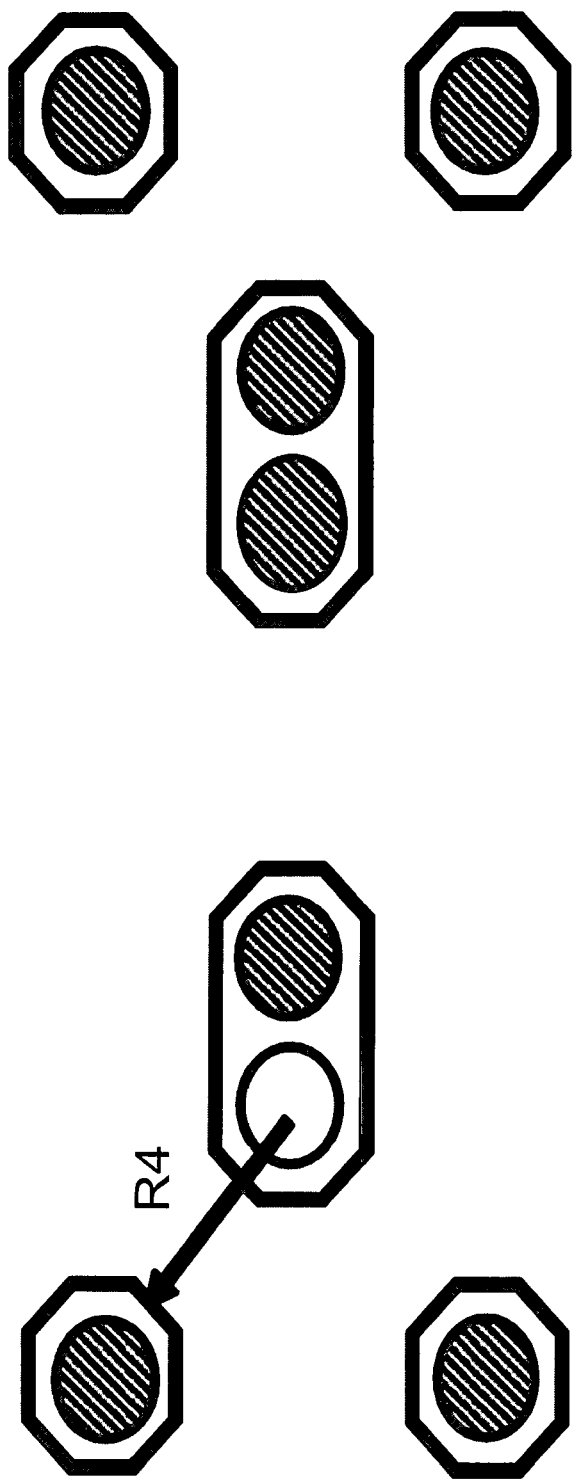

FIG. 4B illustrates the scenario in which R1 is invoked first. As a result, while planned relocations R3 and R4 may take place next, other planned relocations R5, R6 and R7 are deadlocked, as shown, because none of the involved VMs may be relocated without overloading the target host and thus breaking capacity constraints.

Alternatively, however, if R5 is invoked first, then as shown in FIGS. 4C through 4G, a deadlock scenario may be avoided and all relocations may be satisfied—the hollow arrows illustrate the designated, but uncompleted, relocations and the solid filled arrows illustrate a completed relocation leading from a recently freed (i.e., white) resource towards a currently allocated (i.e., filled) resource. Accordingly, a successful order of relocations may be defined as: R5, R6, R7, R1, R2, R3, R4.

Depending on implementation, schemes for avoiding deadlock scenarios such as that shown in FIG. 4B may be based on brute force analysis. That is, an exhaustive search of all possibilities may be performed until a valid relocation plan is found. Unfortunately, such brute force schemes are not scalable in that an exhaustive search may take exponential time as a function of the needed number of relocations.

Another strategy, as provided earlier, may be to abuse specific VMs. Abusing a VM implies that the VM would be temporarily forced to stop running on its current host, thus releasing its resources and avoiding placement conflicts (caused by anti-collocation) with other VMs. One example of an abuse technique is to power off chosen VMs that pertain to a relocation cycle.

The above strategy permits to free resources and therefore may solve relocation cycles. Then VMs that pertain to a relocation cycle to chosen hosts are relocated. Such scheme permits to free resources from the hosts that take part in the relocation cycle. Unfortunately, however, powering off of VMs may not always be possible—for example, due to availability requirements of the service provided by the VM.

Another abuse strategy of relocating a VM toward an intermediary host may also not always be possible (e.g., due to anti-collocation or anti-location constraints). In addition relocations are in general expensive in terms of both time and resource (e.g., network bandwidth) as well as risk incurred (e.g., each relocation has a small chance of failing). As such, in one implementation, the relocations of VMs in the plan is ordered in such a way that avoids relocation cycles if possible, and resorts to abusing VMs when it is impossible to avoid relocation cycles.

By way of example, the following definitions may be utilized to implement a placement and relocation scheme, in one embodiment:
1. Placement is defined by:
   (a) a set of hosts, each with its capacities (for each resource)
   (b) a set of VMs each with its reservation (for each resource)
   (c) a function from the set of VMs into the set of hosts augmented with a fictitious host which is considered as hosting all non placed VMs.
2. Outgoing relocation: Given a host H, a relocation R is said to be outgoing for H if R relocates a VM from H towards another host H'.
3. Outgoing VM: Given a host H, a VM is said to be outgoing for H if there exists an outgoing relocation R which relocates the VM
4. Incoming relocation: Given a host H, a relocation R is said to be incoming to H if R relocates a VM from another host H' towards H
5. Incoming VM: Given a host H, a VM is said to be incoming for H if there exists an incoming relocation R which relocates the VM
6. Source host: A host which participates to the relocation graph and which:
   (a) has at least one outgoing relocation
   (b) has no incoming relocation
7. Ready host: A host such that for any kind of resource, the amount of vacant resources is larger than the sum of all the resource reservations needed by all incoming relocations for that host
8. The ReadySet (placement): the set of relocations that may be performed from a given placement (e.g., separately and without infringing any constraint such as capacity or anti-collocation)
9. AC cycle: A set of relocations which may be sorted in an ordered set $\{r1, r2, \ldots rp\}$ such that:

(a) for all index i in $\{2, \ldots p\}$ the following holds: ri−1 relocates a VM Vi−1 from a host H and ri relocates a VM Vi towards the same host H and Vi−1 is anti-collocated with Vi
   (b) rl relocates a VM V towards a host J from which rp relocates a VM W and V and W are anti-collocated
10. For a given relocation r, ACImmediateBlockedSet(r) is defined as the set of relocations which cannot be fired as long as r has not been fired itself. For ACImmediateBlockedSet(r), anti-collocation constraints are considered and not other constraints such as capacity constraints of the hosts involved.
11. For a given relocation r that does not pertain to an AC cycle, ACRecursiveBlockedSet(r) is defined recursively as sizeOf(ACImmediateBlockedSet(r))+Sum for all relocations s in ACImmediateBlockedSet(r) of the ACRecursiveBlockedSet(s)

In one embodiment, a pre-processing phase is implemented which repeatedly applies the following methods to create prefix and suffix parts for determining the relocation plan:
1. Find a host X which has currently sufficient vacant resources to host all of its incoming VMs. Then "relocate" one or more, and desirably all, those VMs towards X when they are not currently blocked from entering X by other constraints (e.g., anti-collocation). This will extend the current prefix of the plan by appending the relocations to the end of the prefix and updating the relocation plan accordingly.
2. Find a host Y that is currently not a target of any relocation and that contains outgoing VMs. Postpone one or more, and desirably all, of these outgoing relocations to the suffix of the plan (i.e., append these relocations to the beginning of the suffix and update the relocation plan accordingly).
3. repeat steps 1 and 2 above until no matching hosts are found for either step.

The above methods may not result in relocation cycles while generating the plan, and applying the above methods may also cause the processed VMs to be removed from the relocation plan while the relevant portion of the plan is being generated. Furthermore, the relocation graph may be broken and reduced to one or more "core graphs" (hereafter referred to as "cores") to which the above methods may not apply any further thus reducing the plan generation task to a set of less complex subtasks.

If there are one or more cores left after the pre-processing phase, each core is desirably processed by first trying strategies that search for a plan with no cycles (e.g., as provided in further detail below the Euler theorem may be used for simple cores, and an exhaustive search may be used for, for example, medium complexity cores, or a heuristic selection of a single relocation may be used for, for example, higher complexity cores).

If the above scheme fails to reduce a complex relocation plan to smaller less complex sub-parts (i.e., cores), then there is likely that an unavoidable relocation cycle may exist (i.e., that deadlock may not be avoidable in certain circumstances). In that case, one option would be to try to backtrack the heuristic selections of single relocations and restart over using other strategies, or resort to the strategies for breaking relocation cycles by temporarily powering off or diverting VMs.

Figure 5A:
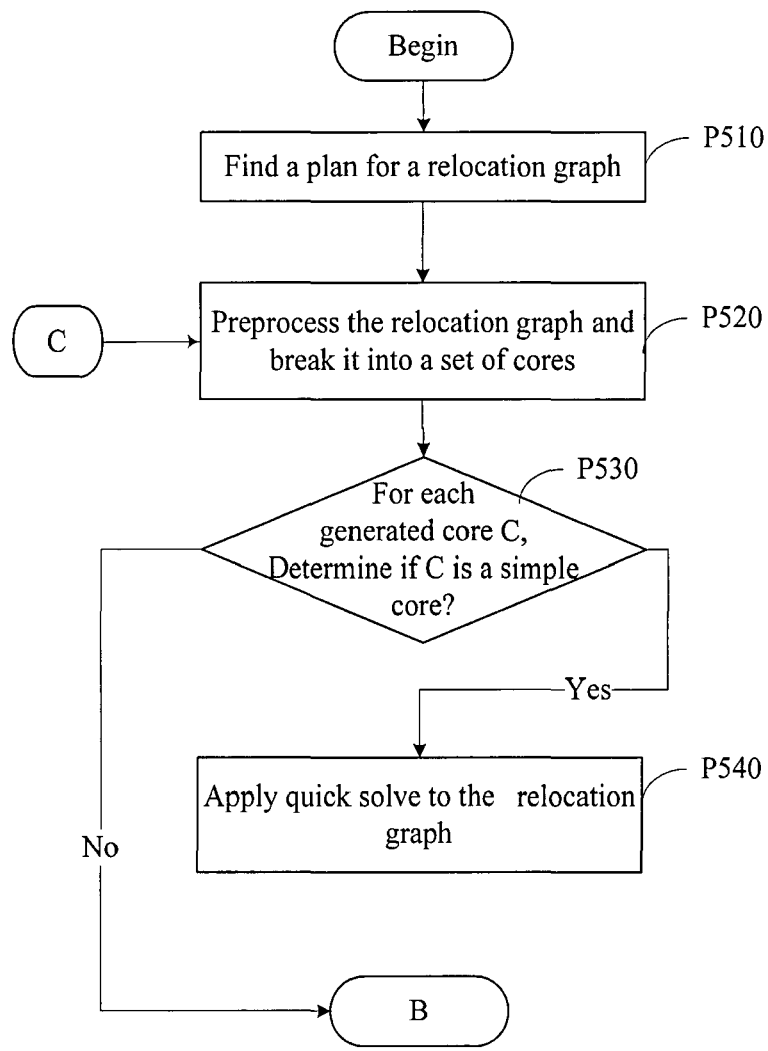
FIGS. 5A and 5B are flow diagrams of exemplary methods for optimizing placement of VMs in a network environment.
Figure 5B:
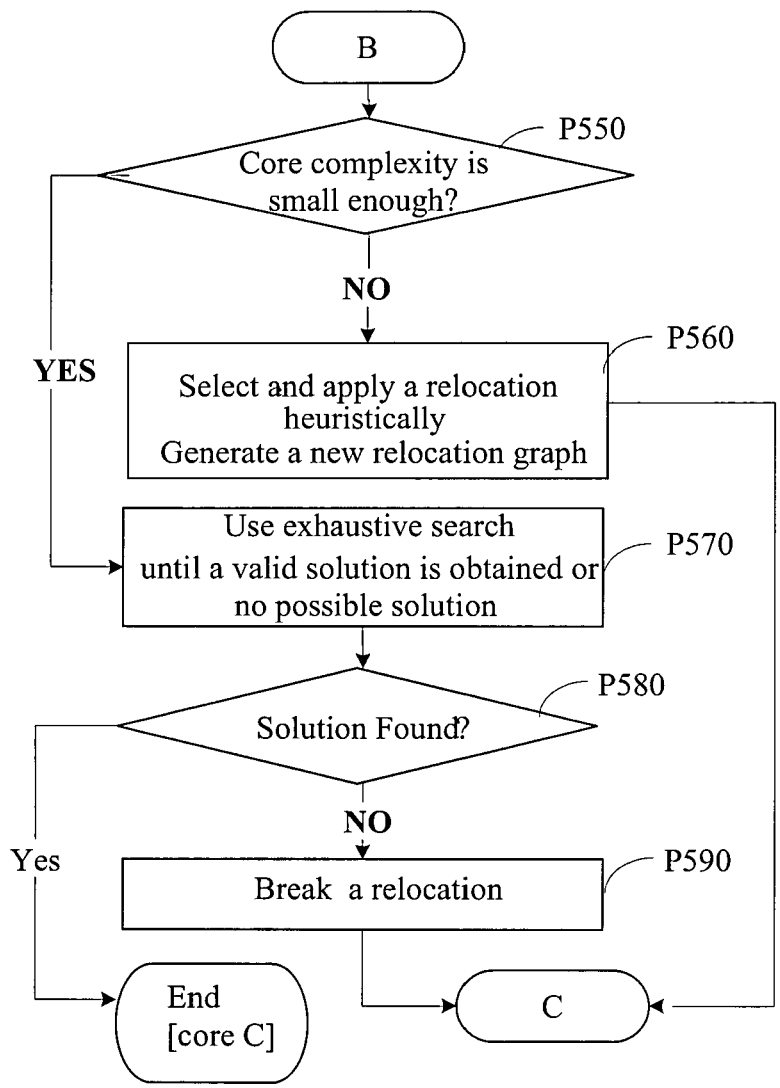

Referring to FIGS. 5A and 5B, a pre-processing phase which breaks complex relocation planning problems into a set of smaller of non-reducible problems is provided in accordance with an exemplary embodiment, wherein valid solutions to a relocation plan are found by implementing the following strategies, preferably in the following order, but not necessarily for all embodiments:
  (a) Using an exact and quick algorithm for simple core problems
  (b) A brute force search algorithm for complex core problems with a relatively limited complexity
  (c) A heuristics search algorithm for choosing one of the possible relocations in a way that helps break the core(s) into a set of smaller cores It is preliminarily noted that prior to invocation of the above process, the removal of VMs that are targeted for removal may be scheduled, desirably in advance. Further, the deployment or powering on of new VMs may be also appended to the plan of relocation, optionally in advance.

Referring to FIG. 5A, to find a plan for a placement change, input parameters including a relocation graph are provided to the system (e.g., a computer implemented device or mechanism). The relocation graph, in one embodiment, reflects the relocations that are to be performed to satisfy the placement for the target VMs (P510). The system then preprocesses the relocation graph and breaks it into a set of cores (e.g., smaller graph components that are desirably less complex in structure and function) (P520).

In the preprocessing phase, certain processes are implemented to permit to simplify the relocation graphs without diminishing the potential to find valid solutions. In one implementation (herein referred to, by way of example, as the "ready method"), the possible incoming relocations are performed (e.g., in any order) toward the ready hosts. It is noted that part of the incoming relocations towards ready hosts may not be possible, for example, if the ready host may contain outgoing VMs that are anti-collocated with incoming VMs.

In another implementation (herein referred to, by way of example, as the "postpone method"), the outgoing relocations that pertain to source hosts are optionally postponed to the end of the relocation plan. The preprocessing phase takes as the input parameter an initial placement (e.g., inputPlacement) and outputs the return value of following preprocess method:

```
Placement preprocess(Placement inputPlacement) {
1. newPlacement1 = output of applying Ready rule to
inputPlacement
2. newPlacement2 = output of applying Postpone rule to
inputPlacement 1
3. If (newPlacement2 != inputPlacement) return
PreProcess(inputPlacement2) else return
inputPlacement
}
```

It is noted that the input parameter inputPlacement may correspond either to the full original problem or to a partial problem generated as a result of selecting and applying a relocation, as provided in further detail below. The value returned by the system is a relocation graph which may be separated into a set of connected components, wherein each component is reduced to a core sub-problem that the algorithm will separately solve.

In one implementation, for each generated core (e.g., core "C"), it is determined if C is a simple core (P530). The set of cores may be increased by recurrent invocation of the preprocessing step that may result from the process of selecting and applying a relocation, discussed in further detail below. A core is simple if the core's contained virtual machines have the same resource requirements and it has no anti-collocation constraints (see for example graph of FIG. 4A).

If a generated core C is a simple core, then a first type of solution (e.g., a so called quick solution) is applied to the relocation graph to determine a relocation and placement plan for the VMs in that core (P540). A first type of solution for a simple relocation graph may be implemented based on the Euler's theorem, for example. According to the Euler's theorem, assuming that a directed graph $G(N, A)$ is given, then the Euler theorem provides that if for each node of G the number of incoming edge is equal to the number of outcoming edges, then there exists a circuit which traverses each edge of G exactly once.

In simple graphs, the relocations of the core involve VMs which, for each given resource type, have the same amount of reservation and for which no constraint (e.g., anti-collocation) imposes a constraint on the order of the triggering of the relocations. To accomplish the above, the relocation graph is modified so that each host will have a number of incoming relocations which is equal to the number of outgoing relocations. This is obtained by adding an additional host HA such that:

1. For each host H which has delta more incoming relocations than outgoing relocations, add fake VMs to H where each of these additional VMs is relocated from H towards HA.
2. For each host H which has delta more outgoing relocations than incoming relocations, add delta fake VMs to host HA where each of these VM is be relocated from HA towards H.

In one or more embodiments, from the solution of the modified problem, the solution of the original problem may be obtained. Host HA may have an equal number of outgoing and incoming relocations. Thus, each host in the modified relocation graph has an equal number of incoming and outgoing relocations. The transformed relocation graph is a connected directed graph where each node has an equal indegree and outdegree. Thus, the theorem of Euler for directed graph applies and provides that the graph has an Euler tour (i.e., a circuit which traverses every edge on a graph exactly once, beginning and terminating at the same node).

Referring to FIG. 5B, which details the case when the generated core C is not a simple core, it is determined if the complexity of C is small enough (i.e., the core complexity is below a certain threshold) (P550). The complexity of a core is estimated by determining the size of the set of incoming relocations for each of the hosts. The complexity approximation of a core is defined as the product of all the incoming relocation set sizes (note that all the hosts in a core have at least one incoming relocation, else they would have been eliminated by the postpone preprocessing rule).

If it is determined that core C has a relatively high complexity (i.e., the core complexity is not below a certain threshold, then a relocation is heuristically selected and applied as provided earlier (i.e., a heuristics search algorithm is used to choose one of the possible relocations in a way that helps break the core(s) into a set of smaller cores), and a new relocation graph is generated (P560). Otherwise, if the core is determined to have a small enough complexity, the solution may be found by way of an exhaustive search (P570). If a solution is found (P580) then the handling of current core (e.g., core C) is completed, otherwise the system attempts to break a relocation as provided in further detail below (P590).

In one embodiment, if the core complexity is estimated to be under a certain threshold, an exhaustive search may be performed by choosing a relocation from the ReadySet (placement) and applying it. If the choice for the relocation is to be determined based on heuristics, it may be performed in the following manner:

(a) For each relocation of ReadySet(placement), compute the projected placement complexity (as provided below)
(b) Choose the relocation which has the lowest projected placement complexity The projected placement complexity is computed by:
(a) Applying the preprocessing method to the placement to output a set of cores which is referred to as the projected set of cores
(b) Estimate the complexity of each of the cores in the projected set of cores
(c) Output the maximum complexity of the projected set of cores It is noteworthy that if the ready set size is larger than a predetermined threshold, the placement process may be accelerated by not choosing the relocation with lowest projected placement complexity but the first relocation which yields a placement with a projected complexity that is sufficiently low, either in absolute terms or relative to other complexity of other projected placements, for example.

In one embodiment, an exhaustive search (i.e., a brute force) method may be used when a core complexity is estimated to be small enough so that the core may be handled thru an exhaustive search. The search may be performed by implementing a depth first search algorithm which stops when either a first valid plan is found or when possible orderings fail at generating a valid plan. At each phase of the search, one of the unapplied relocations of the ready set is chosen either randomly or based on a path that maximizes the odds of finding quickly a valid plan.

For a given relocation of the ready set, the relocation which maximizes the benefit( ) function will be chosen such that:

benefit($r$)=ACRecursiveBlockedSet($r$)+Size of the ReadySet(projected); where the term projected designates the projected placement obtained from current placement by firing $r$ It is noteworthy that the heuristic approach referred to above may be improved by, for example:
(a) Taking into account the amount of resources that are blocked in the definition of ACRecursiveBlockedSet(r)
(b) Introducing a decay constant (valued between 0 and 1) in order to progressively give less importance to blocked relocations when they are "far away" from r If the solution to the relocation is not found, the system attempts to break the relocation cycle (using the abuse methods mentioned above) and reverts back to the preprocessing method (see P520 and P590 in FIGS. 5A and 5B). Choice of VM to be abused may be limited to the VMs that either may be powered off (in order to release resources) or VMs for which there exists a host outside of current relocation graph where it may be relocated. If the system did not find a VM that could be broken, that means that the core contains for a relocation cycle could not be broken.

In the above scenario, the sole possibility (if relevant) to progress towards a solution maybe to backtrack a heuristic decision that was previously taken. Backtracking reverses a heuristic decision taken previously and chooses an alternative relocation. In one implementation, the backtracking is utilized as an option for exceptional cases, where there is an indication that the original problem has no solution. If the generated cores are solved as the result of applying the above procedures, then a solution of the full problem is reached.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 6A:
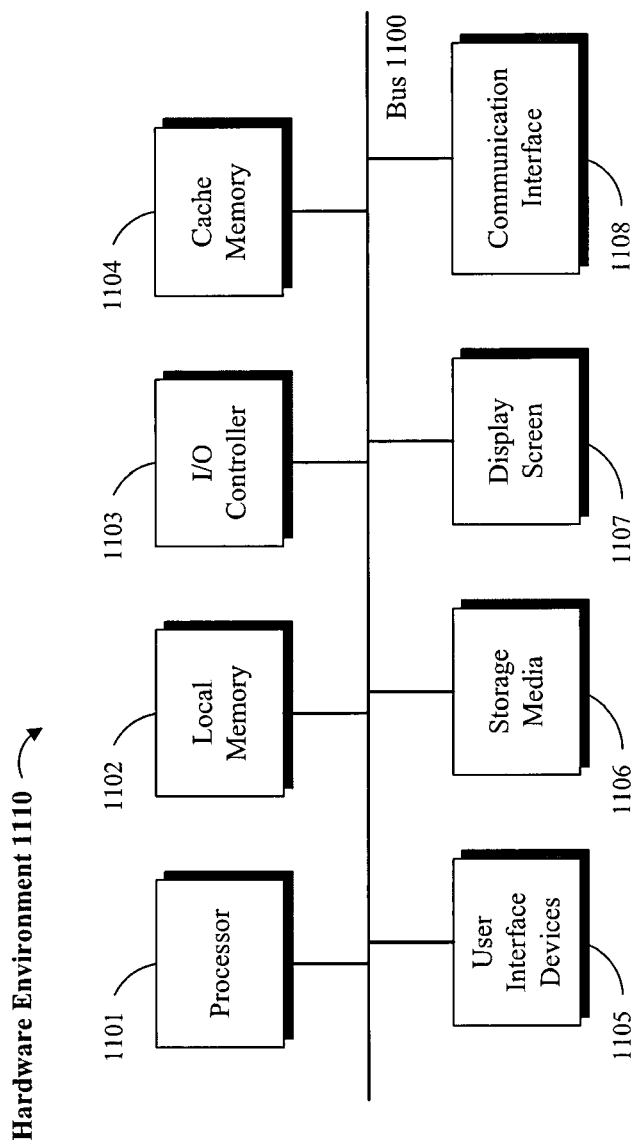
FIGS. 6A and 6B are block diagrams of hardware and software environments in which the disclosed systems and methods may operate, in accordance with one or more embodiments.
Figure 6B:
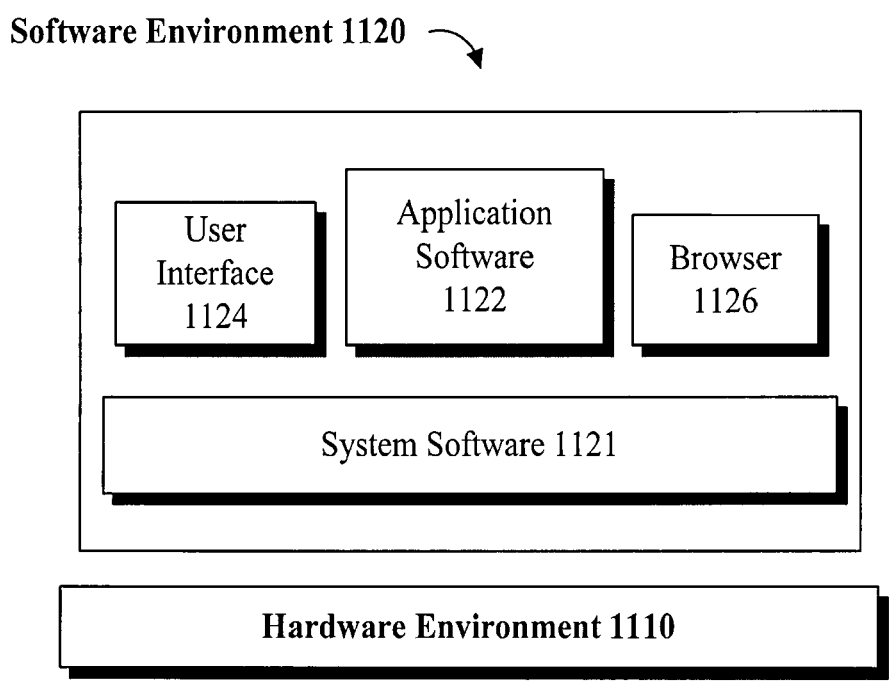

Referring to FIGS. 6A and 6B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 6A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 6B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that may contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that may communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that may direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

In some embodiments, the disclosed subject matter may be implemented in a cloud computing environment as provided in further detail below. It is noteworthy that the claimed subject matter shall not be construed to be limited to a cloud computing environment. Rather, different embodiments may be implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, VMs, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment Models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

Figure 7A:
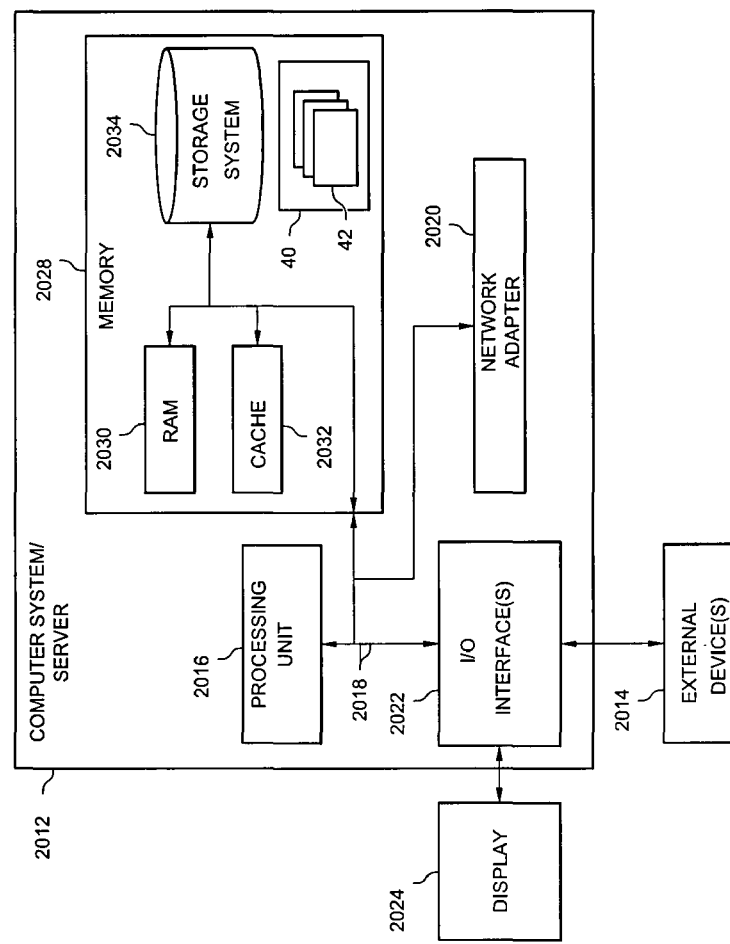
FIG. 7A depicts a cloud computing node according to one embodiment.

A cloud computing environment is service oriented with a focus on statelessness, low coupling, modularity, and semantic interoperability. At the heart of cloud computing is an infrastructure comprising a network of interconnected nodes. Referring now to FIG. 7A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 7B:
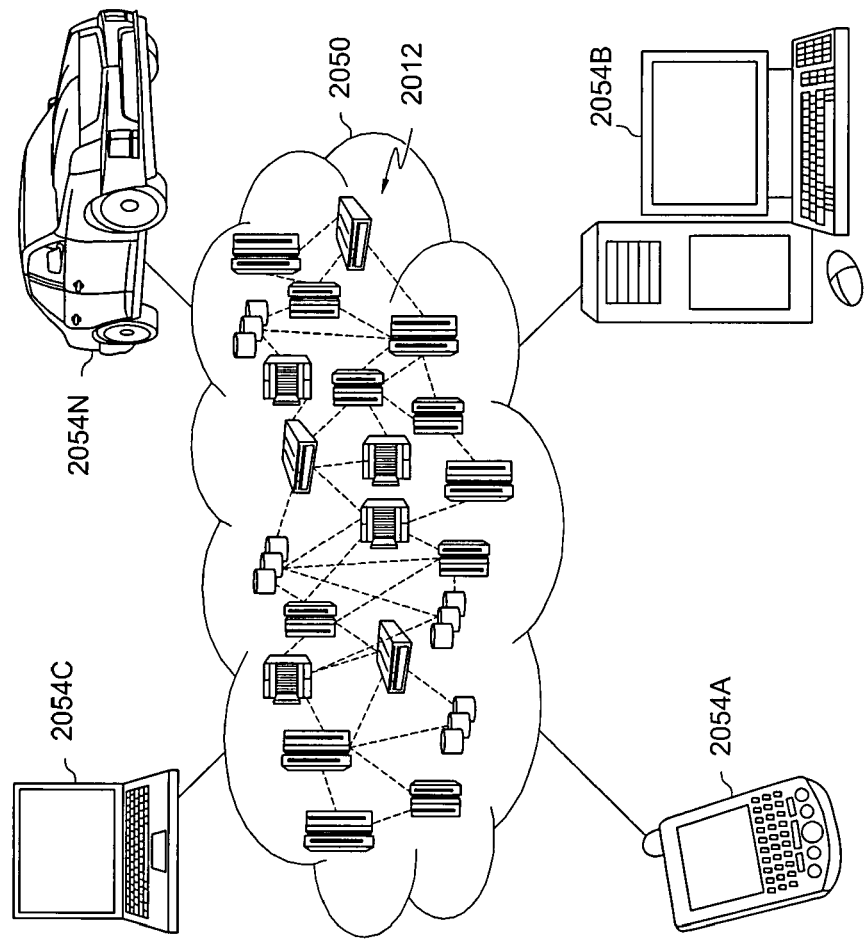
FIG. 7B depicts a cloud computing environment according to one embodiment.

Referring now to FIG. 7B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 7B are intended to be illustrative only and that computing nodes 2010 and cloud computing environment 2050 may communicate with any type of computerized device over any type of network and/or network addressable connection (e.g., using a web browser).

Figure 7C:
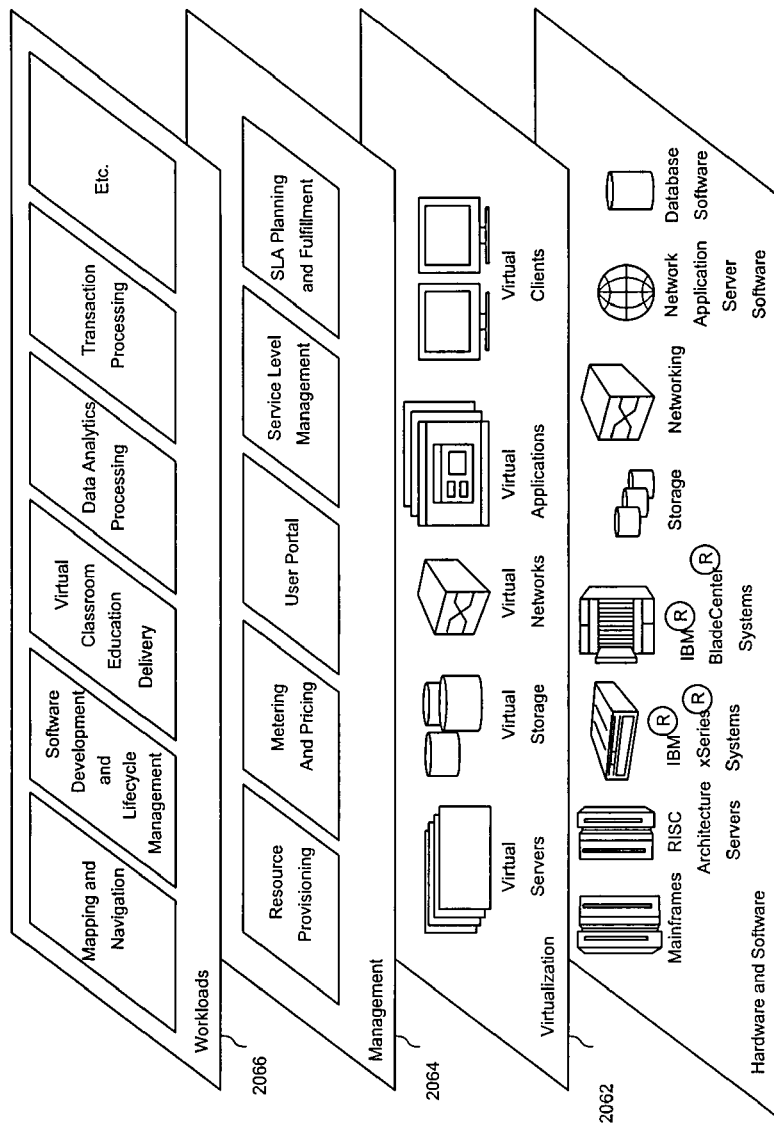
FIG. 7C depicts abstraction model layers according to one embodiment.

Referring now to FIG. 7C, a set of functional abstraction layers provided by cloud computing environment 2050 (FIG. 7B) is shown. It should be understood in advance that the components, layers, and functions shown in FIG. 7C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented method for generating a placement plan for one or more virtual machines (VMs) in a computing environment, the method comprising:
    providing, to a computing system, input parameters comprising:
        a current placement for the one or more VMs on one or more hosts in a computing network;
        a target placement that assigns at least one of the one or more VMs to at least another host in said one or more hosts;
        a set of constraints with which both the current placement and the target placement comply; and
    computing a placement plan to achieve the target placement for a target VM based on a placement sequence, wherein intermediary placement states are determined for the target VM according to the placement plan so that the target VM is migrated according to the placement sequence over one or more hosts in such a way to avoid a relocation cycle that results in a deadlock state in view of the set of constraints and the placement plan as applicable to other VMs, wherein the computation of the placement plan further comprises:
        computing a relocation graph that reflects placement changes for VM deployments, relocations or removals that are to be performed to implement the placement plan, wherein a node in the graph represents a host, and an edge in the graph pointing from a first node to a second node represents a planned VM relocation from a first host to a second host, the first node representing the first host and the second node representing the second host;
        breaking the relocation graph into one or more cores using the input parameters to the computing system, wherein a core comprises a first relocation graph that is smaller in size than the relocation graph;
        for a core, determining if the core is a simple core, wherein a core is determined to be simple if VMs in that core have same resource requirements and have no anti-collocation constraints; and
        in response to determining that the core is a simple core, applying a first solution to the first relocation graph to determine a relocation plan or a placement scheme for VMs in that core.

2. The method of claim 1, wherein the first solution is implemented based on Euler's theorem such that a host is planned to have a same number of VMs relocated from the host as a number of VMs that will be relocated towards the host.

3. The method of claim 1, further comprising:
    in response to determining that the core is not a simple core, determining whether the core's complexity is below a first threshold; and
    in response to determining that the core's complexity is below the first threshold, applying a second solution to the first relocation graph to determine the relocation plan for the VMs in that core.

4. The method of claim 3, wherein the second solution comprises performing an exhaustive search on the first relocation graph to determine the relocation plan for the VMs in that core.

5. The method of claim 3, further comprising
    in response to determining that the core is not a simple core, determining whether the core's complexity is below above a second threshold; and in response to determining that the core's complexity is above the second threshold, rather than performing an exhaustive search, applying a third solution to the first relocation graph to determine the relocation plan or the placement scheme for the VMs in that core.

6. The method of claim 5, wherein the third solution comprises applying one or more relocations for one or more VMs in the first relocation graph to generate another relocation graph.

7. The method of claim 1 wherein the breaking of the graph into one or more cores is done by recursively:
   identifying relocations which may be initiated immediately without breaking compliance with the set of constraints and without causing any possible relocation cycle and moving those relocations out of the relocation graph and appending them to a prefix of the relocation plan; and
   identifying relocations which may be initiated after the relocations in the relocation graph without breaking compliance with the constraints and without causing any possible relocation cycle and moving said relocations out of the relocation graph and prepending them to a suffix of the relocation plan.

8. The method of claim 3, wherein complexity of a core is estimated by determining size of a set of incoming relocations for one or more hosts in the core, wherein the estimated complexity of a core is defined as a product of the incoming relocation set sizes, wherein the hosts in a core have at least one incoming relocation.

9. A computer implemented system for generating a placement plan for one or more virtual machines (VMs) in a computing environment, the system comprising processing units comprising:
   a processor;
   a logic unit for providing, to a computing system, input parameters comprising:
      a current placement for the one or more VMs on one or more hosts in a computing network;
      a target placement that assigns at least one of the one or more VMs to at least another host in said one or more hosts;
      a set of constraints with which both the current placement and the target placement comply; and
   a logic unit for computing a placement plan to achieve the target placement for a target VM based on a placement sequence, wherein intermediary placement states are determined for the target VM according to the placement plan so that the target VM is migrated according to the placement sequence in such a way to avoid a relocation cycle that results in a deadlock state in view of the set of constraints and the placement plan as applicable to other VMs, wherein the system further comprises the following for computation of the placement:
      a logic unit for computing a relocation graph that reflects placement changes for VM deployments, relocations or removals that are to be performed to implement the placement plan, wherein a node in the graph represents a host, and an edge in the graph pointing from a first node to a second node represents a planned VM relocation from a first host to a second host, the first node representing the first host and the second node representing the second host;
      a logic unit for breaking the relocation graph into one or more cores using the input parameters to the computing system, wherein a core comprises a first relocation graph that is smaller in size than the relocation graph;
      a logic unit for determining if a core is a simple core, wherein a core is determined to be simple if VMs in that core have same resource requirements and have no anti-collocation constraints; and
      a logic unit for applying a first solution to the first relocation graph to determine a relocation plan or a placement scheme for VMs in that core in response to determining that the core is a simple core.

10. The system of claim 9, wherein the first solution is implemented based on Euler's theorem such that a host is planned to have a same number of VMs relocated from the host as a number of VMs that will be relocated towards the host.

11. The system of claim 9, further comprising:
    a logic unit for determining whether the core's complexity is below a first threshold, in response to determining that the core is not a simple core; and
    a logic unit for applying a second solution to the first relocation graph to determine the relocation plan for the VMs in that core in response to determining that the core's complexity is below the first threshold.

12. The system of claim 11, wherein the second solution comprises performing an exhaustive search on the first relocation graph to determine the relocation plan for the VMs in that core.

13. A non-transitory computer readable storage medium having computer readable instructions stored thereon, wherein execution of said instruction by a computing machine causes the computing machine to:
    provide, to a computing system, input parameters comprising:
       a current placement for the one or more VMs on one or more hosts in a computing network;
       a target placement that assigns at least one of the one or more VMs to at least another host in said one or more hosts;
       a set of constraints with which both the current placement and the target placement comply; and
    compute a placement plan to achieve the target placement for a target VM based on a placement sequence, wherein intermediary placement states are determined for the target VM according to the placement plan so that the target VM is migrated according to the placement sequence in such a way to avoid a relocation cycle that results in a deadlock state in view of the set of constraints and the placement plan as applicable to other VMs, wherein the computation of the placement plan further comprises:
       computing a relocation graph that reflects placement changes for VM deployments, relocations or removals that are to be performed to implement the placement plan, wherein a node in the graph represents a host, and an edge in the graph pointing from a first node to a second node represents a planned VM relocation from a first host to a second host, the first node representing the first host and the second node representing the second host;
       breaking the relocation graph into one or more cores using the input parameters to the computing system, wherein a core comprises a first relocation graph that is smaller in size than the relocation graph;
       for a core, determining if the core is a simple core, wherein a core is determined to be simple if VMs in that core have same resource requirements and have no anti-collocation constraints; and in response to determining that the core is a simple core, applying a first solution to the first relocation graph to determine a relocation plan or a placement scheme for VMs in that core.

14. The non-transitory computer readable storage medium of claim 13, wherein the first solution is implemented based on Euler's theorem such that a host is planned to have a same number of VMs relocated from the host as a number of VMs that will be relocated towards the host.

15. The non-transitory computer readable storage medium of claim 13, wherein execution of said instruction by a computing machine further causes the computing machine to:
    in response to determining that the core is not a simple core, determine whether the core's complexity is below a first threshold; and
    in response to determining that the core's complexity is below the first threshold, apply a second solution to the first relocation graph to determine the relocation plan for the VMs in that core.

16. The non-transitory computer readable storage medium of claim 13, wherein the second solution comprises performing an exhaustive search on the first relocation graph to determine the relocation plan for the VMs in that core.

* * * * *